US005660023A

United States Patent [19]

Kivelä

[11] Patent Number: 5,660,023
[45] Date of Patent: Aug. 26, 1997

[54] METHOD AND APPARATUS FOR WRAPPING OF AN ARTICLE

[75] Inventor: Kalle Juhani Kivelä, Nilsiä, Finland

[73] Assignee: Cross Wrap Oy, Siilinjarvi, Finland

[21] Appl. No.: 532,744

[22] PCT Filed: Mar. 31, 1994

[86] PCT No.: PCT/FI94/00129

§ 371 Date: Sep. 18, 1995

§ 102(e) Date: Sep. 18, 1995

[87] PCT Pub. No.: WO94/22717

PCT Pub. Date: Oct. 13, 1994

[30] Foreign Application Priority Data

Apr. 7, 1993 [FI] Finland ..................... 931596
Feb. 11, 1994 [FI] Finland ..................... 940646

[51] Int. Cl.⁶ .................... B65B 27/12; B65B 11/58
[52] U.S. Cl. .................... 53/399; 53/449; 53/176; 53/587; 53/588
[58] Field of Search .................... 53/399, 449, 465, 53/176, 587, 588, 211, 215, 210

[56] References Cited

U.S. PATENT DOCUMENTS

| 4,694,636 | 9/1987 | Griffin . | |
| 4,730,436 | 3/1988 | Angelino . | |
| 4,793,124 | 12/1988 | Anderson . | |
| 4,930,292 | 6/1990 | Focke et al. | 53/588 |
| 4,955,181 | 9/1990 | Casteel | 53/587 X |
| 5,027,581 | 7/1991 | Kovacs . | |
| 5,105,607 | 4/1992 | Gratton | 53/587 |
| 5,140,798 | 8/1992 | Lancaster . | |
| 5,184,449 | 2/1993 | Hannen . | |
| 5,195,301 | 3/1993 | Martin-Cocher et al. . | |
| 5,216,871 | 6/1993 | Hannen | 53/588 X |

FOREIGN PATENT DOCUMENTS

| 0467729 | 6/1991 | European Pat. Off. . |
| 0565055 | 4/1993 | European Pat. Off. . |
| 2159489 | 5/1984 | United Kingdom . |
| 2221203 | 7/1988 | United Kingdom . |
| 9113540 | 3/1991 | WIPO . |
| 9217371 | 4/1992 | WIPO . |

*Primary Examiner*—Linda Johnson
*Attorney, Agent, or Firm*—Browdy and Neimark

[57] ABSTRACT

A method and apparatus are for wrapping a bale (30) in a web, such as plastic film material. In a first wrapping stage the bale is moved along a bed while the web material is wrapped around it by a dispenser moving about the path of the bale. The dispenser rotates about a first (horizontal) axis while the bale moves parallel to the first axis. In a second wrapping stage the web dispenser is rotated 90 degrees and held stationary while the bale is rotated about a second, vertical axis.

17 Claims, 3 Drawing Sheets

METHOD AND APPARATUS FOR WRAPPING OF AN ARTICLE

The present invention relates to a method for wrapping an article or object in accordance with what, and more particularly to a method in which the article is wrapped by rotating said article. Furthermore, the present invention relates to an apparatus for wrapping an article.

It is prior known to wrap articles, such as fodder bales, straw bales or pulp bales, various packages or for example smaller goods or objects loaded on a pallet or the like with a suitable wrapping material web, such as a plastic sheet or a wrapping film. Such a wrapping has been performed for example such that a sequence of articles is conveyed in the direction of movement thereof into a wrapping apparatus in which the articles pass through a rotating circular ring. The rotating ring is provided with at least one dispenser or straining device including a roll of plastic film which rotates with the ring around the article and from which plastic is unwound and wrapped around the outer surfaces of the article. A problem exists in that, in case the articles have to be separated after wrapping, there is no cover or shield provided by the wrapping material on the ends of the articles since only the sides of the articles can be wrapped with the wrapping material when the articles in the wrapping apparatus are tightly successive with their ends attached to each other. In case the articles are not separated from each other, the result is a long and heavy string of articles which is difficult to handle and in which there are a plurality of successive articles within the same wrapping film. Also, the ends of said string of articles are without a shield provided by the wrapping film against mechanical stresses and/or for example against weather conditions and sunlight.

U.S. Pat. No. 5,184,449 (Hannen) discloses a solution in which the whole rotating ring is swung 90° and thus a cover is provided which is wrapped in two directions around the load on a pallet. However, the disadvantage of said solution lies on the complex and heavy structure. The supporting and the upward-downward movement of the ring in the horizontal position requires an extremely rigid construction of the apparatus and turning means whose power demand is high, especially then when the articles to be wrapped are big in size. Such a construction is naturally not suitable for applications in which the wrapping device is used as a movable unit.

Round articles, such as round bales or the like are wrapped one by one in a plastic film by devices which are provided with a rotating table and in which the bale is rotated while the dispenser dispenses the film around the bale. Such devices are disclosed, for instance, in EP Patent Application No. 0 565 055, NO Patent Application No. 884841, GB Patent Application No. 2 221 203 and SE Patent No. 467 248. However, only individual articles can be wrapped with the film by said devices whereupon the capacity of such devices is poor. Furthermore, said devices are suitable only for wrapping of cylindrical articles.

It has been found lately that, for example, in connection with fodder or straw bales or the like the formation of a round bale in a baling machine is more inefficient as to the capacity of the machine than making a so-called "square bale" of a shape of the rectangular prism. The apparatuses forming a square bale or the like can be arranged to operate continuously since the need of stopping the formation process is avoided during the binding of the article, which stopping is required when forming round bales in the baling machine. The efficiency of such machines forming square bales compared to the machines forming round bales is that much higher that they are used more and more instead of machines forming round bales, despite the fact that the wrapping of the square shaped articles is more difficult. The problem lies in the fact that there are no suitable devices for the wrapping of the parallelepided shaped articles with a weblike material. Several proposals have been made in an attempt to modify the aforementioned round article wrapping machines with various optional equipments in order to adapt them to wrap also square shaped articles. However, the users have not been satisfied with the operation of such apparatuses, for instance because of the high consumption of the wrapping material and thus the uneconomical operation of the device and because of the general difficulties in the operation and slowness of the wrapping procedure.

The object of the present invention is to overcome the disadvantages of the prior art proposals and to provide a totally new solution for the wrapping of articles with a weblike material, the wrapping of the articles being, according to said solution, easy, light, reliable and economically profitable.

A further object of the present invention is to provide a method and an apparatus for carrying out said method by which the articles can be wrapped in connection with a continuously operating device forming the articles such that the wrapping stage Of the article does not interrupt the operation of the forming device and that the operation of the wrapping apparatus is automatic.

A further object of the present invention is to provide a method and an apparatus for carrying out said method by which the article can be wrapped while the wrapping apparatus is on the move and preferably such that the article forming device moving in front of the wrapping apparatus forms the next article to be automatically transferred into the wrapping apparatus after being finished, while the previous article is wrapped in the wrapping apparatus, and which apparatus automatically begins the wrapping operation of said next article after finishing the wrapping of the previous article.

A further object of the present invention is to provide a method and an apparatus for carrying out said method, by which the picking-up of the article into the apparatus can be easily performed. An additionally object is to provide a solution wherein the removal of the wrapped article is easy to perform and takes place without causing any damages to the article or the wrapped cover.

Another object of the present invention is to provide a wrapping apparatus which performs the wrapping automatically and which is capable of automatically interrupting its operation in case of any trouble, whereby the apparatus requires less control by the operator than the prior known solutions.

An additional object of the present invention is to provide an apparatus by which more than one article can be wrapped in the same wrapping.

The present invention is based on the idea that by wrapping the article in two stages and in directions of two planes disposed substantially normal to each other, a wrapping is produced, which covers the entirety of the article and which is solid enough to resist the mechanical and other stresses presented to it.

According to a preferred embodiment of the present invention the apparatus for wrapping articles, such as bales of straw, fodder, cotton, branch, pulp or waste, or various packages, goods or objects loaded on a pallet or the like, with a suitable web like material, such as a plastic film or the like, comprises a frame in which a first table or bed or similar means is assembled for receiving the article. Correspondingly said frame is provided with a second table or bed, from which the wrapped article is removed through the rear end of the apparatus. The tables are preferably provided with suitable pivotal means and tilting means, such as hydraulic cylinders or the like for controlling the position of the tables. The pivoting point of each table is preferably disposed in the end of the table which extends towards the center of the apparatus. Additionally, the tables are constructed such that the articles are able to move along the tables at least in the longitudinal direction of the apparatus. Said tables can be arranged as, for example, short roller carriages or belt conveyors or any other suitable conveyor constructions. According to one embodiment of the present invention the apparatus further comprises means for assisting the transfer of the article to the second table and for supporting the article during the transfer and means for removing the article from said second table.

In a preferred embodiment of the present invention wrapping means are provided between the tables. The wrapping means are arranged such that at least one source of wrapping material rotates circumferentially around the article in a first, preferably vertical plane such that the article is wrapped over its entire length around a first axis thereof or in other words around its first sides. It should be understood that the first wrapping means can also be arranged to rotate around the article in a horizontal plane. The wrapping means comprise at least one dispenser means which are arranged such that the direction of the face of the wrapping material web can easily be turned about 90°. For example, the arrangement can be such that the axis of the wrapping material roll is tiltable or that the direction of the face of the web is tiltable by suitable means without turning the axis of the roll.

The apparatus further comprises means for rotating the article in a second plane which is substantially normal to said plane of rotation of said wrapping material dispenser means. The rotation can be carried out by any suitable drive means, such as a hydraulic or an electric drive means or by means which take the power from the movement of the apparatus by such means as, for example, a suitable transmission from the rotation of the wheels, as provided for in one embodiment of the present invention.

According to one preferred embodiment of the present invention said rotating means are mounted to one of said tables such that they are arranged by suitable means to project upwards from the table, to grip in a suitable way the article and then to rotate the article in said horizontal plane.

According to another embodiment the table is provided with means for lifting the article upwards and further means are provided above said table for supporting and rotating the article above said table. It should be understood that also in this solution the rotational movement of the article can alternatively be accomplished from below the article.

According to one embodiment of the present invention the apparatus comprises means which are arranged to grip the article from the ends or from one side or from two opposite sides thereof, which means are arranged to move the article upwards and downwards and to rotate the article around its horizontal axis of rotation.

The apparatus may further comprise means by which the articles can be placed one upon the other, side by side or one after the other, whereafter they can be wrapped into a single wrapping.

According to one preferred embodiment, the apparatus further comprises wheels or in some cases runners or similar means to enable the moving of the apparatus. In this case the apparatus further comprises draw beam means connected to the frame for connecting the apparatus to pulling means, such as to the article forming device moving ahead of the apparatus, or to a tractor. Also, according to a further preferred embodiment of the present invention the draw beam of the wrapping apparatus is connected to said article forming device at the center thereof, i.e. such that the draw beam of the wrapping apparatus is disposed at the longitudinal center line of the forming apparatus, which center line is located in the midway of the axis between the wheels of the forming apparatus. As a result thereof, the wheels of the wrapping apparatus move in the same tracks as the forming device, which facilitates the driving of the apparatus and decreases the compression of the ground and which minimizes the pulling stresses caused by the wrapping apparatus on the forming device. According to yet one further embodiment the construction of the draw beam is such that it can be quickly changed in order to be suitable for a connection to a separate pulling device.

According to one preferred embodiment of the invention the axis of the wrapping roll of the wrapping means is provided with means monitoring the rotation of said axis, which means are operatively connected to the control means of the wrapping apparatus and which means signal the stopping of the rotation of the roll, for example in case the wrapping film runs out or breaks.

According to one embodiment of the present invention all functions of the wrapping apparatus, such as tilting of the tables, controlling of the rotation of the wrapping means, starting and finishing of the wrapping stage, controlling of the rotation of the article and controlling of the wrapping work cycle in general, are operationally connected to a common controlling device. The controlling device may, for example, be arranged in a form of various logics, programmable control means or suitably arranged valve gears.

In the use of the apparatus according the present invention the working cycle starts when according to one embodiment of the present invention the baling machine has formed a bale which forming of the bales is preferably a continuous operation. The finished bale is removed from said baling machine and moves towards the first table of the wrapping apparatus, which preferably is an extension of the outlet path of the baling machine when the apparatus is connected behind said movable baling machine according this embodiment.

Alternatively it is possible to pick up the article from the ground onto the forward tilted first table or it is possible to transfer the articles onto the first table of the wrapping apparatus or similar initial bed for the wrapping procedure by separate conveyor means.

Subsequently the article moves towards the wrapping means and as the front end thereof reaches said wrapping means the rotating of said wrapping means around the article is started, whereby a suitable wrapping material, such as a plastic film or similar, unwound from the wrapping material roll, is made to revolve around the article. At the same time the article is slowly moved forward whereupon the total length thereof becomes wrapped. After this, the article is preferably gripped from underneath by suitable gripping means and the rotation of the article in the plane substantially normal to the plane of the axis of rotation of the wrapping means begins, whereby the article is wrapped from all sides thereof and two surfaces of the article are provided with a wrapping in two layers. It is also often preferred to slowly rotate the wrapping means around the axis of rotation thereof while the article is rotated, whereby the wrapping becomes evenly settled on the surface of the article. Finally the wrapping film is cut off and the article is removed from the second table, preferably by tilting the table backwardly.

It should be understood that it is possible to perform the wrapping of the article in the opposite sequence as well, i.e. such that in the first stage the article is rotated and subsequently in the second stage the wrapping material roll means are rotated around the article.

Significant advantages are obtained by the present invention. The wrapping work of the articles quickens since the wrapping work can be performed while the next article is being manufactured, for example is formed in a baling machine. By one single apparatus according to the present invention it is possible to wrap articles which substantially vary as to their size and shape. The number of required machines and labor is decreased since the same pulling device, such as a tractor, is capable simultaneously of pulling both the forming and the wrapping apparatuses, which also decreases the adverse compression of the ground. The wrapping work is simplified and the need for the monitoring thereof decreases since the article is automatically transferred from the forming device to the wrapping apparatus and the control of the wrapping apparatus is such that the wrapping apparatus is capable of operating automatically according to the preset operation parameters. The quality of the wrapped articles increases since they are wrapped from all sides thereof. This means that a small additional advantage results from the neater appearance of the wrapped articles. Furthermore, the consumption of the wrapping material decreases substantially compared to the prior art techniques.

In the following the present invention and the other objects and advantages thereof will be described by way of an example with reference to the annexed drawings, in which the similar reference characters throughout the various figures refer to the similar features. It should be understood that the following description of an example of the invention is not meant to restrict the invention to the specific forms presented in this connection but rather the present invention is meant to cover all modifications, similarities and alternatives which are included in the spirit and scope of the present invention, as defined by the appended claims. For example, included amongst such modifications would be the provision of a wrapping apparatus which is fixedly mounted onto a solid conveyor and which is used in an industrial environment to wrap articles, such as goods loaded on a pallet, according to the present invention.

Figure 5:
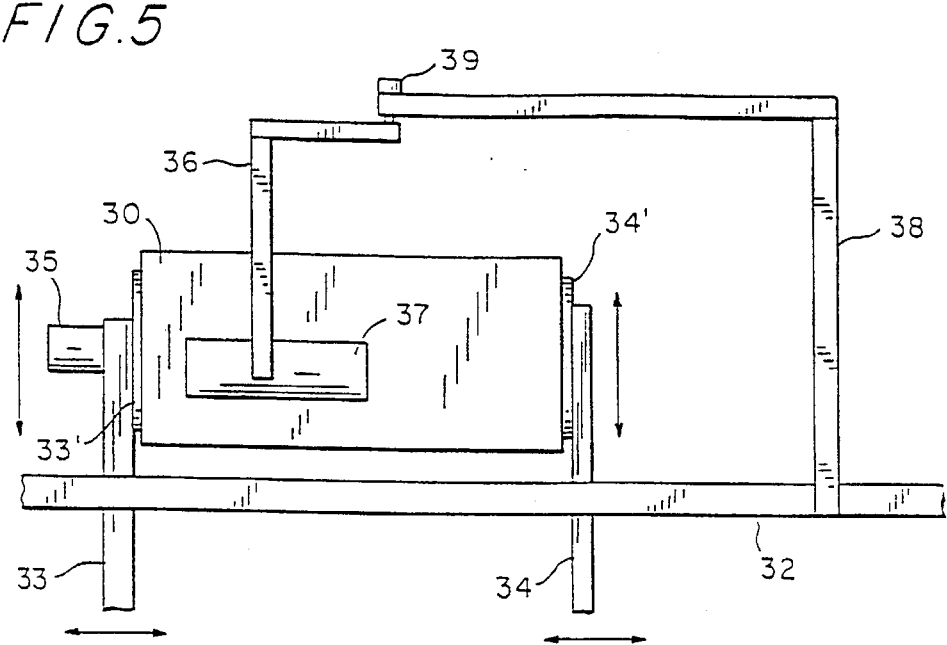
Figure 6A:
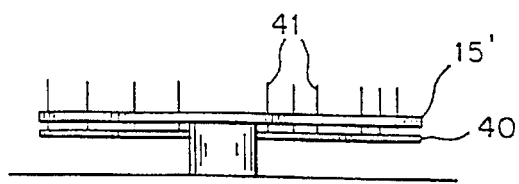
Figure 6B:
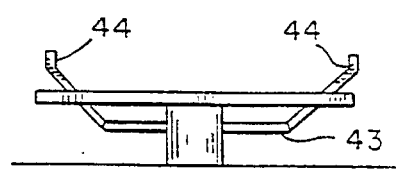
Figure 7:
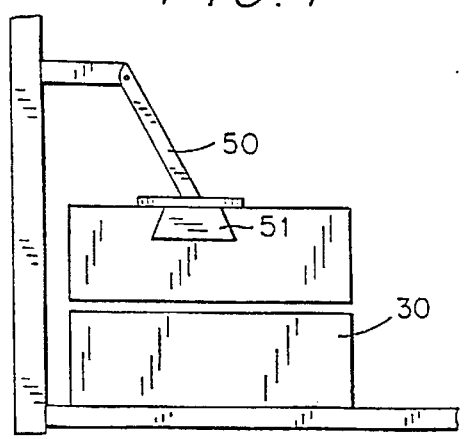

FIG. 5 discloses a wrapping apparatus according a further embodiment of the present invention;

FIGS. 6A and 6B disclose examples of the gripping means of the rotating table; and FIG. 7 discloses a device for lifting of the articles on top of one another.

Figure 1:
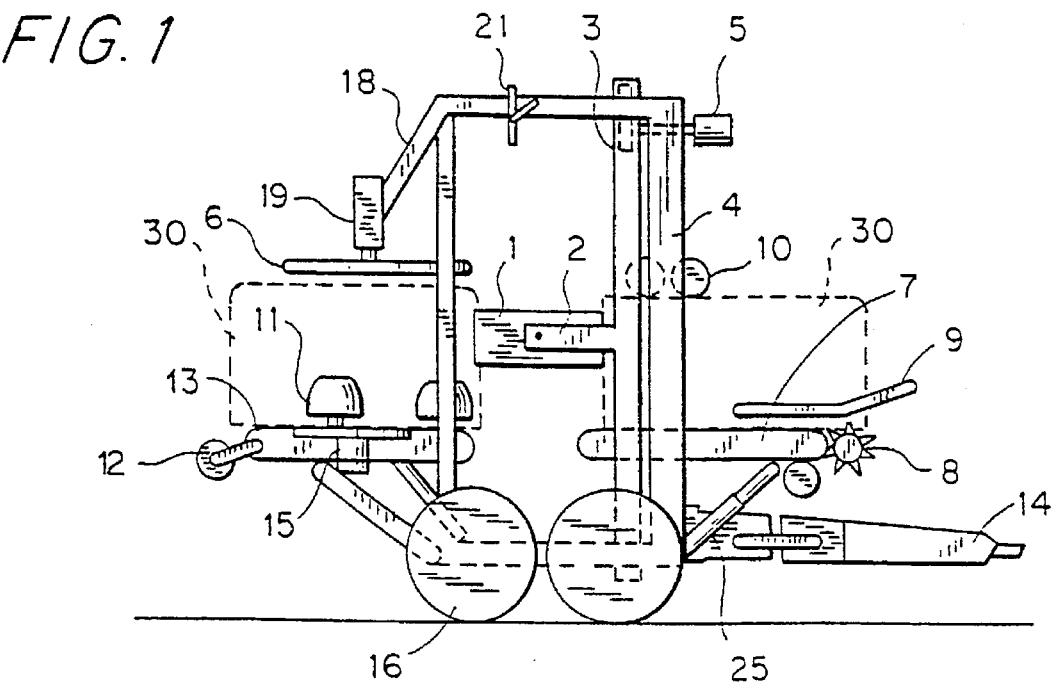
FIG. 1 is a simplified schematic side view of a wrapping apparatus according to the present invention.

The frame 4 of a wrapping apparatus according to a preferred embodiment of the present invention shown in FIG. 1 is formed by a framework which is substantially rectangular in shape when viewed from the front, side and top of the apparatus. In said embodiment a bogie 16 is mounted to the lower part of the frame, the attachment point of the bogie to the frame being adjacent to the mass center of the apparatus and to rear of the mass center.

Figure 2:
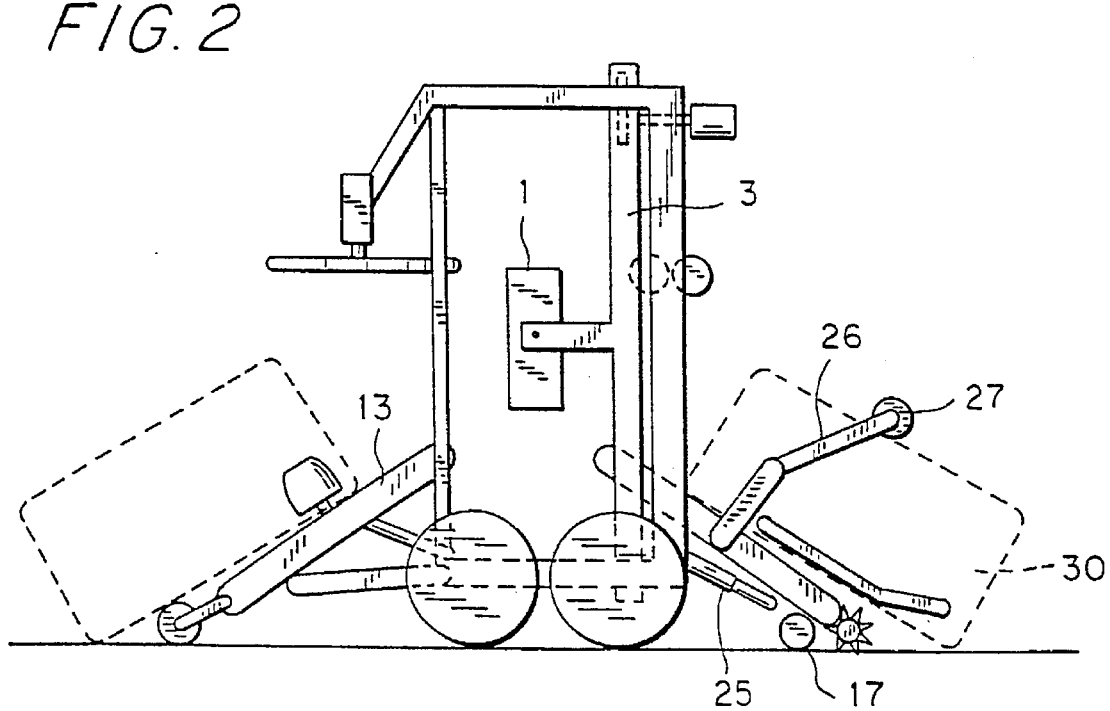
FIG. 2 is a schematic view of the wrapping apparatus shown in FIG. 1 in a position in which the tables thereof are tilted to an article receiving/removing position.

In said embodiment a tiltable first table or front table 7 is pivotally mounted to the front portion of the frame 4, whereby an article 30 is received to the wrapping apparatus and is transferred through a ring 3. The front table 7 operates as a supporting structure when the article is received directly from the forming apparatus or when the apparatus is used as a fixed wrapping apparatus and as a lifting structure when the apparatus is used by the side of a tractor and the article is lifted from the ground (see FIG. 2). The tilting and the lifting is realized by a hydraulic cylinder means 25 or the like. The front end of the front table is further provided with a roller 8 extending across the table said roller is provided with spikes, catches or any other suitable gripping members for assisting the lifting of the article from the ground when the front table is tilted off the ground. Said roller also operates as a retainer member for the article during the lifting process and thus prevents the article from falling back onto the ground. It is also preferable to arrange the roller 8 to move the article towards the front table when the article 30 is received directly from the forming device. Below the front end of the front table is placed one or several supporting wheels 17, which are provided to keep the lower edge of the front table slightly off from the ground. At the sides of the front end of the front table, slightly above the upper surface of the front table and extending partially forward from the front table are guide rods 9, which, at the front parts thereof, are bent to an angle upwards and outwards, whereby the incoming article is easily guided to the front table. Furthermore, an upper supporting roll means 10 are rotatably mounted to the front section of the frame such that they are disposed at a suitable height from the upper surface of the front table relative to the height of the article. Said roll means are provided in order that they prevent the article from falling to the front end thereof during the movement of the article over an open section after the front table. Said roll means 10 may be replaced or the apparatus may be further provided with a supporting means 26 mounted to the front table as shown in FIG. 2, which means comprise a roll 27 for supporting the article. Said supporting means 26 bear the article during the transfer thereof onto the table and during the movement thereof from the first table to a second table.

Said second table 13 is consequently mounted pivotally to the rear section of the frame, said second table receiving the article 30 for the second wrapping stage, whereafter said article is finally lowered to the ground (see FIG. 2). The tilting and the lowering is accomplished by a hydraulic cylinder means or the like. The rear end of the rear table is further provided with a rear supporting roll 12, which extends across the table and is arranged to assist the removal of the article. Both sides of the rear table may be provided with cone shaped side guide rollers 11 which are arranged such that the distance between said rollers can be adjusted according to the size of the article to be wrapped.

In the embodiment shown in FIG. 1 a supporting arm 18 extending backwards and downwards the top and having a bearing housing 19 for the vertical axis of rotation of a counter plate 6 is provided in the upper section of the frame of the apparatus. Said counter plate may also be attached non-rotatably to the supporting arm whereupon the small friction between the wrapping material and the counter plate allows the rotation of the article, although the counter plate is bearing against the article.

An article lifting and rotating mechanism 15 is mounted to the rear table for lifting the article against the counter plate 6 positioned above the table and for rotating the article in a horizontal plane in the second stage of the wrapping procedure. The lifting and rotating mechanism may alternatively be provided with means which are arranged to grip the article, for example with such means as those shown in FIGS. 6A and 6B, whereby the supporting means above the article are unnecessary.

Each of the tables can be provided with a belt conveyor or a similar conveyor and drive means therefor. A belt conveyor draws the article onto the table and correspondingly moves it on and pushes it off the table. Alternatively the belt conveyor in one or each of the tables may be replaced with a roller carriage, which in some embodiments can be driven by suitable drive means.

Figure 4:
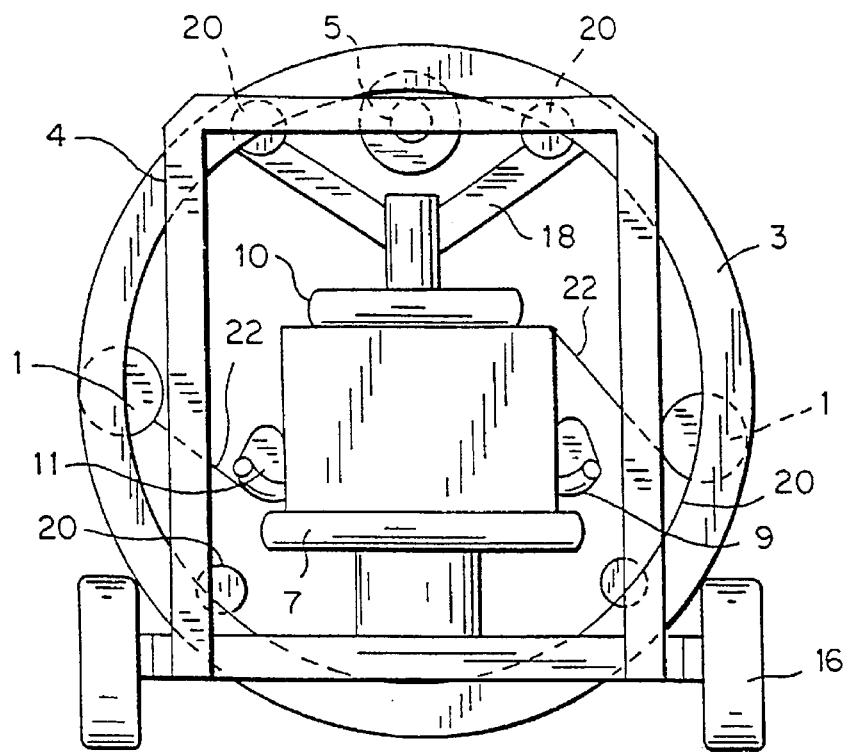
FIG. 4 is a view taken from the front of the apparatus shown in FIG. 3.

According to the embodiment shown in FIG. 4 four rotatable guide runners 20 around a horizontal axis are assembled inside the framework of the front section of the frame 4. The bearing points of the guide runners form, when seen from the front of the apparatus, a symmetrical quadrangle in which the two upper runners are placed in the same horizontal plane and correspondingly the two lower runners are placed in the lower horizontal plane and the diagonal lines from corner-to-corner intersect each other in the middle of the apparatus, when seen in the horizontal direction. A rotating circumferential ring 3 operating as a wrapping member is disposed on the guide runners 20. The cross section of the ring is, for example, a U channel section facing to the center of the ring. The guide runner 20 is arranged to fit inside said U channel profile such that the ring cannot move in the vertical or horizontal directions. Said ring 3 is only able to rotate by the guide runners around the horizontal axis thereof. The rotating of the ring 3 occurs by a motor 5, which is attached to the upper section of the frame to rotate the ring from the inner surface of the ring.

Backwards from the ring and parallel with the horizontal axis thereof extend two bear arms 2 which are attached in said ring 3. The bear arms are disposed such that they are 180° apart from each other in the ring. In each of the bear arms is disposed a pivotally assembled dispenser 1 which includes a wrapping material roll for the wrapping of the article. The dispenser add the wrapping material roll therein can be swivelled 90° about the pivoting point between the bear arm and the dispenser. The swivelling is performed by a tilting member 21 positioned in the frame by turning the tilting member to its lower position and rotating the ring 3 about its axis of rotation.

It should be understood that the ring 3 can be replaced with suitable arm means which are arranged to provide a circumferential movement of the dispenser and/or the wrapping material roll around the article in one plane.

Figure 3:
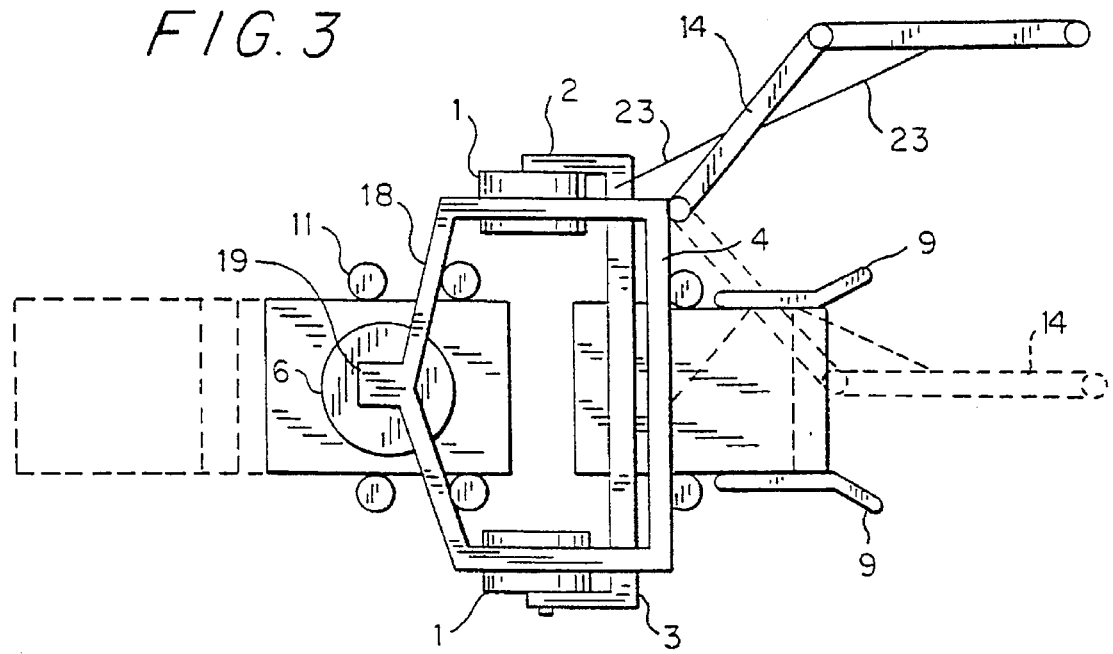
FIG. 3 is a view taken from above of a wrapping apparatus according to the present invention.

Furthermore, draw bar means 14 of a two-piece construction are pivoted in the lower corner of the frame, the draw bar means having two operational positions. In the position according to FIG. 3 the draw bar means presented with a solid line are totally turned to the side of the apparatus such that the front portion of the draw bar means is substantially parallel with the direction of movement and the rear portion of the draw bar means is at an angle relative to the direction of movement. This position is used when the wrapping apparatus is, for example, arranged to be pulled at by the side of a tractor. In a position presented by the dashed line the draw bar means are turned inwardly such that the front portion of the draw bar means still is parallel with the pulling direction and is disposed substantially in the longitudinal center line of the wrapping apparatus. This position is used when the apparatus is connected directly to the rear of the apparatus forming the article. The operating positions of the draw bar means 14 are controlled by members 23 pivotally attached to the frame and the bar means.

FIG. 5 shows another embodiment of the present invention in which the wrapping means 31 are rotated in the horizontal plane and the article 30 is rotated about the horizontal axis thereof i.e. in the vertical plane. In this alternative embodiment of the present invention the wrapping apparatus is positioned above a solid conveyor path 32, instead of two separately arranged tables. The apparatus further comprises arm means 33 and 34 arranged to co-operate with the conveyor path 32, which arm means are suitably arranged to move adjacent to the ends of the article. The gripping means 33' and 34' provided in said arm means are arranged to grip the article. At least one of said arm means is provided with drive means 35 by which the article can be rotated about the longitudinal axis thereof. In said embodiment the arm means are raised and lowered in a vertical direction through the conveyor path, as indicated by the arrows, but they may also be arranged to project over the path 32 from the sides thereof. Roll means 37 pivotally mounted on the end of a rotating arm 36 can be swivelled 90° about the pivoting point thereof and the rotating arm can be rotated about the article by the drive means 39 mounted on a beam 38.

FIG. 6A shows schematically one means arranged into the lifting and rotating mechanism for gripping to the article. The solution disclosed in FIG. 6A comprises a lifting member 15' through which the spikes 41 of the gripping member 40 are arranged to penetrate. The gripping member is suitably arranged to move relative to the lifting table such that the spikes 41 can penetrate into the article through the table and be easily pulled out of the article with the aid of the upper surface of the lifting table 15'.

FIG. 6B shows schematically an alternatively embodiment of the gripping means. The articulated arm mechanism 43 presented therein is constructed such that the gripping means 44 arranged at the ends of the arms are arranged to grip the lower portion of the article, such as a pallet. Such gripping means are known to those skilled in the art and in this connection it is important only, that the gripping means are of a suitable type for being mounted to the lifting member.

FIG. 7 shows a means for piling the articles which comprises means 50 for gripping and lifting the article. Said means for piling further comprises a gripping element 51 by which the article 30 arriving along the conveyor can be lifted up and then lowered onto the next article arriving along the conveyor, prior to the beginning of the wrapping procedure. The apparatus can, of course, be equipped with means which are capable of placing the articles side by side or one after the other or both side by side and one after the other prior to the wrapping stage.

The wrapping is performed by the following procedure. The arrival of an article onto the table depends on whether the article is picked up from the ground or is received directly from the device forming the articles. In case the article, such as a fodder bale or similar, is picked up from the ground, the front table 7 is tilted in the forward direction downward until supporting wheels 17 hit the ground. After this, the article is approached such that the pulling device, such as a tractor, moves besides the article until a lifting roller 8 hits the article, after which the lifting procedure is started by tilting the front table back towards its horizontal position. The gripping means provided in the lifting roller grip the article and lift the edge of the article off the ground. Said lifting roller can now be rotated such that said lifting roller passes said front edge of the article to the lower surface of the article whereby the article is moved onto the front end of the front table. As the rear edge of the article still lies on the ground and the wrapping apparatus further advances in a direction towards the article, the transferring of the article onto the table is further effected. It is also possible to utilize a supporting means 26 shown in FIG. 2 when transferring the article onto the table. Finally, the article is drawn in its entirety onto the front table by a belt conveyor or similar means which also forms the upper surface of the front table. Guides 9 assist in the guidance of the article.

When the front table is back in its horizontal position the actual wrapping can begin. If the article is received directly from the forming device, it is not always necessary to have such a tilting table. However, in some cases it may be useful to tilt the table in order to fit together the heights of the discharge of the forming machine and the front end of the first table.

When the article is in a suitable position on the front table the wrapping is started, in accordance with the preferred embodiment, by moving the article through the ring 3 while the vertical ring 3 is rotated about its horizontal axis. Alternatively the article can be moved through a circular path of the wrapping material roll which path is defined by suitable wrapping arm means or similar means. At this stage the dispensers 1 and thus the wrapping material rolls are in a substantially horizontal position and thus the surface of the material web 22 emerging from the roll is also in the substantially horizontal plane. The wrapping material rolls provided in the ring 3 rotate about the article while the article penetrates through the ring, whereby the material web unwinding from the rolls 1 becomes wrapped on the sides of the article. The first wrapping stage ends when the article has penetrated through the ring 3 to the rear table 13. Immediately after this comes the second stage in which the article is lifted by a lifting mechanism 15 off the surface of the rear table. In case guide rolls 11 are provided in the apparatus, they are moved away or the article is lifted so much by the lifting mechanism 15 that the article can freely rotate about a vertical axis of rotation of said lifting mechanism. Said lifting mechanism further comprises gripping means for taking a hold of the article, whereby no special support for the article is required. The dispensers and thus also the rolls therein in the ring 3 are pivoted 90° relative to their initial position and thereafter the article is rotated about its the center axis in the horizontal plane by the lifting mechanism 15. It is advantageous to rotate also the ring 3 whereby the ends of the article become covered over their total height. The ring 3 is rotated so much that the wrapping material passes over the corners of the article, whereby all corners of the article are provided with double wrapping i.e. in the corners the wrapping material is placed at least in two layers.

According to an alternative embodiment, the article is pushed towards a counter plate 6 by the lifting mechanism 15 and thus the gripping means of the lifting mechanism 15 are not necessarily required.

According to one yet alternative embodiment the wrapping material dispenser is circulated about the article in the horizontal plane and the article is rotated in the vertical plane.

It is self-evident that the aforementioned first and second wrapping stages can also be performed in an alternative sequence and that the means for rotating the article can also be arranged in connection with the first table.

During said second wrapping stage the next article to be wrapped is transferred into a suitable position onto the front table. After finishing said second wrapping stage the wrapped article is lowered onto the surface of the rear table 13 and slightly moved towards the front table and said next article. Substantially at the same time the dispensers and thus the material web rolls are swivelled 90° back to their initial positions, the ring 3 is rotated for a couple of revolutions and said next article is moved towards the rear table. Thus the wrapping material web, which is not yet cut, grips around the next article and the wrapping thereof can begin. At this stage the wrapped article is lowered from the rear table to the ground or is moved ahead along the conveyor. At the same time the wrapping material web is cut between the wrapped article and the next article to be wrapped. In case the web is not broken by itself i.e. by the movement of the wrapped article it is cut by suitable cutting means. The rear table is returned to its initial position and the wrapping of the following article continues and, thus, a new operation cycle follows the previous one. Thus, the wrapping of the articles is a continuous process and a high capacity is achieved.

For the successful wrapping result, it is essential to swivel the axis of the web material roll or the plane of the web material surface 90° by a suitable swivelling means between the two wrapping stages. By this feature the surface of the article is provided with a cover or shield in which the wrapping material web extends both in the horizontal and in the vertical directions. Additionally, a saving of 30% in the amount of wrapping material used is achieved when comparing to the prior known wrapping methods in which there is a need to wrap extra layers of the wrapping material around the article because of the lack of reliability of the known wrapping techniques.

The swivelling of the material web roll is preferably performed by projecting a swivelling means 21 shown in FIG. 1 towards the circular path of the dispenser and the material web roll and by rotating the dispenser past said swivelling means, whereby the dispenser and the roll therein is swivelled. Accordingly, the dispenser and the roll are returned to their initial vertical position by rotating the dispenser again past said swivelling means 21. In an alternative embodiment the return to the initial position is performed by changing the direction of movement of the dispenser in the circular path and the dispenser is moved back to the projecting means for the swivelling of the dispenser. The dispenser is provided with a gas spring or similar means in order to hold the roll steady in the position to which it is swivelled according to the respective stage of wrapping.

The foregoing discloses a preferred embodiment according to the invention but it is clear to those skilled in the art that the invention can be modified and applied in many other ways without departing from the spirit and scope of the present invention defined in the appended claims. For example, it should be understood that after the second wrapping stage the article can be positioned transversely relative to the conveyor and then once more wrapped over the ends thereof. It should also be understood that although the aforementioned examples mainly relate to movable arrangement, the invention can readily be modified to operate as a fixed arrangement, for example an arrangement to be used in industrial solutions.

I claim:

1. A method of wrapping articles with a wrapping material web, comprising:

moving an article along a bed means for moving the article past wrapping means for wrapping including at least one wrapping material dispenser means for dispensing, and simultaneously rotating said dispenser means around said article along a circular path about a first axis of rotation, whereby the wrapping material web emerges from said dispenser means such that a surface of said wrapping material web is substantially parallel to said first axis of rotation and said wrapping material web becomes wrapped on sides of said article in a first direction as said article moves along said bed means, subsequently turning said surface of said wrapping material web emerging from said dispenser means such that said surface of said wrapping material web becomes substantially normal to said first axis of rotation, said step of turning said surface of said wrapping material web being accomplished such that said wrapping means remain in said circular path about said first axis of rotation, and rotating said article around a second axis of rotation, substantially normal to said first axis of rotation, whereby the wrapping material web is provided onto the sides of said article in a second direction of wrapping substantially normal to said first direction of wrapping.

2. The method as set forth in claim 1 including rotating said dispenser means around said first axis of rotation along the circular path in a substantially vertical plane, said first axis being essentially horizontal and rotating around said second axis of rotation in a substantially horizontal plane, said second axis being essentially vertical.

3. The method as set forth in claim 1 comprising further steps of providing a lifting means, lifting said article from said bed and providing means for rotating such that said article is enabled to rotate about said second axis of rotation, and gripping said article by gripping elements provided in the lifting means during lifting and rotating said article about said second axis of rotation.

4. The method as set forth in claim 1 comprising further steps of lifting said article by a lifting means and pushing said article against a counter plate whereby said article is restrained between said lifting means and the counter plate during the rotation of said article about said second axis of rotation.

5. The method as set forth in claim 1 comprising further steps of gripping said article by gripping means, lifted from said bed means and rotated about said second axis of rotation in a substantially vertical plane and circulating said wrapping material dispenser means about said first axis of rotation along a circular path of rotation disposed in a substantially horizontal plane.

6. The method as set forth in claim 1 wherein said turning of said surface of said wrapping material web emerging from said dispensing means comprises swivelling by 90° of said dispensing means between subsequent stages of wrapping.

7. The method as set forth in claim 1 wherein said dispenser means are slowly circulated around said article about said first axis of rotation while said article is rotated about said second axis of rotation.

8. An apparatus for wrapping an article with a wrapping material web, said apparatus comprising:

bed means (7,13;32) for receiving and movably supporting said article (30) such that said article is moved along said bed means in one stage of wrapping, at least one dispenser means (1;37) for dispensing the wrapping material web, wrapping means (3;36) for circulating said dispenser means (1;37) about a first axis of rotation around said article for wrapping, in a first wrapping stage, said wrapping material web (22) around said article as said article is moved along said bed means while keeping a surface of said wrapping material web (22) substantially parallel to said first axis of rotation, means (15;35) for rotating said article about a second axis of rotation in a second wrapping stage, said second axis being substantially normal to said first axis of rotation, and means (21) for turning said surface of said wrapping material web (22) emerging from said dispenser means (1;37) between the first and second wrapping stages such that the surface of said wrapping material web becomes substantially normal to said first axis of rotation, while said wrapping means (3;36) are arranged to remain rotative about said first axis of rotation.

9. The apparatus as set forth in claim 8 wherein said wrapping means include a substantially vertically disposed circular ring (3) which is rotatably assembled onto support roller means (20) disposed in the framework (4) of said apparatus and which circular ring further includes at least one support arm (2) extending from said ring (4) for pivotally supporting said dispenser means (1).

10. The apparatus as set forth in claim 8 wherein said bed means include a first table (7) and a second table (13) which are arranged such that there is an open space between said first and second tables (7,13) and such that said wrapping means (3) is disposed between said tables, said open space being wider than the width of said wrapping material web (22), said apparatus being provided with means for conveying said article over said open space and with means (10) for supporting said article during the movement of said article over said open space.

11. The apparatus as set forth in claim 10 wherein said tables (7,13) are provided with tilting means (25) arranged to tilt said tables such that the ends of said tables extending away from said wrapping means (3) are capable of being turned towards the ground so that said first table (7) tilts for the picking-up of an article and said second table (13) tilts for the removal of said article.

12. The apparatus as set forth in claim 8 wherein said bed means (7,13;32) include means (15;33,34) for rotatably lifting said article from said bed means (7,13;32) and for rotating said article (30) in said second plane.

13. The apparatus as set forth in claim 12 wherein said lifting means (15;33,34) include gripping means (41;44) arranged to grip said article during said rotation about said second axis of rotation.

14. The apparatus as set forth in claim 12 wherein said apparatus further includes a counter plate (6) arranged to co-operate with said lifting means (15) for supporting and rotating said article.

15. The apparatus as set forth in claim 8 wherein said apparatus further comprises means (50) for piling said articles (30) on top of another or side by side prior to the wrapping stages.

16. The method as set forth in claim 1, wherein the step of moving the article along the bed means includes moving the article in a generally straight line generally parallel to the first axis of rotation.

17. The apparatus as set forth in claim 8, wherein the bed means includes means for moving the article in a generally straight line generally parallel to the first axis of rotation.

* * * * *